J. H. REEDY.
PAPER ROLL MOUNTING.
APPLICATION FILED MAY 17, 1920.
1,419,983.
Patented June 20, 1922.
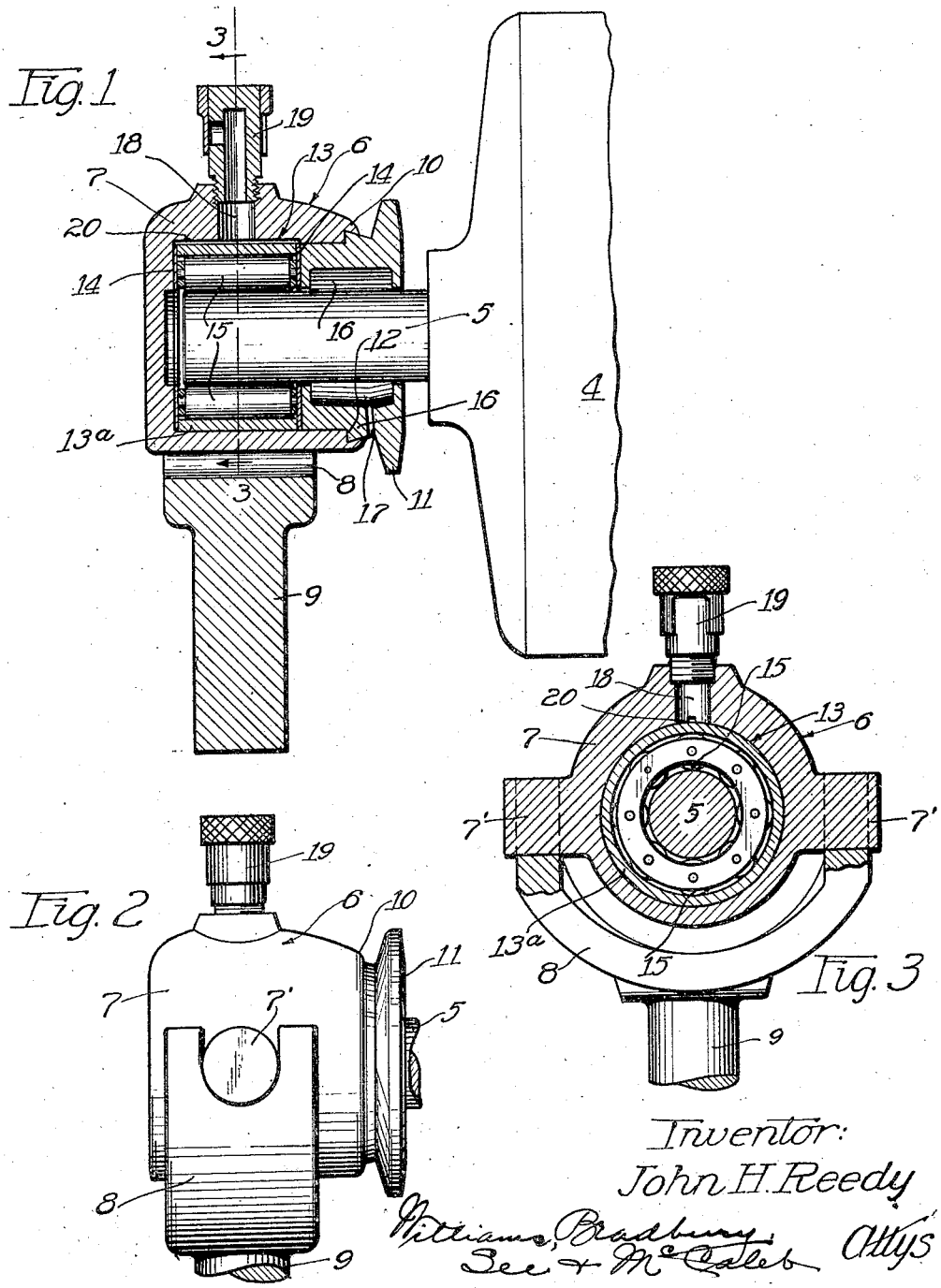
Inventor:
John H. Reedy
Williams, Bradbury,
See & McCaleb
Attys

UNITED STATES PATENT OFFICE.

JOHN H. REEDY, OF HAMILTON, OHIO.

PAPER-ROLL MOUNTING.

1,419,983. Specification of Letters Patent. Patented June 20, 1922.

Application filed May 17, 1920. Serial No. 381,902.

*To all whom it may concern:*

Be it known that I, JOHN H. REEDY, a citizen of the United States, and resident of Hamilton, in the county of Butler and State of Ohio, have invented a certain new and useful Improvement in Paper-Roll Mountings, of which the following is a full, clear, concise, and exact description, reference being had to the accompanying drawings, forming a part of this specification.

My invention relates to mountings, and is particularly concerned with the provision of a mounting for table rolls, felt rolls, etc. of paper making machines.

Among its principal objects, my invention contemplates the provision of a mounting, which permits easy rotation of the roll, and its ready removal and replacement in its support.

Another object resides in providing a mounting of this kind, which is self-aligning, and water sealing, and which may be economically manufactured.

Other objects, advantages and uses of my improved mounting, will appear in the following description, reference being made to the accompanying drawings, wherein Figure 1 is a longitudinal vertical section of the mounting of my invention, illustrated in co-operating relation with a paper-roll of conventional construction.

Figure 2 is a side elevation of the mounting shown in Figure 1, and

Figure 3 is a vertical cross section taken on line 3—3, of Figure 1, looking in the direction indicated by the arrows.

Referring to the drawings, the reference numeral 4 designates the end portion of a table roll, having the journal 5, which extends into, and is supported by, the improved mounting of my invention, which is indicated generally by the reference numeral 6.

As indicated above, my improved mounting is especially adapted for use in connection with the rolls of paper making machines. The roll shown at 4 in the drawing is a conventional table roll for a Fourdrinier machine. The construction and operation of the Fourdrinier machine is so well known and understood by engineers, skilled in this art, that it is not deemed necessary to show, or describe, such a machine, and it will further be distinctly understood that although my invention finds particular utility in connection with paper making machines of the Fourdrinier type, it may be used in connection with many other types and kinds of machines, as will hereinafter appear.

The mounting 6 comprises a main body member 7, which is provided with supporting trunnions 7' 7' received by a suitable yoke member 8, on the lower end of which is provided a shank 9, which is cylindrical in form, and arranged to be adjustably received in a suitable socket provided therefor in the frame of the machine.

The body member 7 is substantially cylindrical in form (see Fig. 3) and is shouldered at its open end and provided with an annular lip 10. A bushing 11, fitting into the open end of the body member 7, is provided with a shoulder 12 arranged to co-act with the shoulder provided on the member 7. The lip 10 as seen in Figures 1 and 2, is turned over, and securely clamps the bushing 11 to the member 7. It will, of course, appear that although I prefer to provide the lip 10 to hold the bushing 11 in position, any other suitable expedient may be used for this purpose.

At 13 is indicated a roller bearing which comprises spacing rings 14—14 and bearing rollers 15—15, the said rollers co-operating with a suitable race ring 13$^a$. The elements of the roller bearing 13 are held in their proper relation by the bushing 11 and the journal 5 extends through the bushing 11 into the bearing as shown. The bushing 11 is recessed as at 16, and has a suitable drain hole 17, provided at its lowermost portion.

An oil hole 18 is provided in the wall of the member 7, communicating with the interior thereof; a suitable oil cup 19 being threaded therein, as shown. At 20 is indicated an oil groove, which is preferably provided to establish communication between the oil hole 18 and the edges of the bearing 15.

In the Fourdrinier paper making machines, the rolls 4 support a so-called "wire" which is in the form of a web, and on which the mixed paper stock from the "head box" in a thoroughly saturated condition is carried over the surface of the frame, over the usual "save-all" and suction chambers, to the "couch rolls." The wire after a period of four or five weeks generally becomes worn out, and must be renewed. When the wire is properly slacked, the rolls 4 are lifted out, and the mounting 6 slipped off the end of the journal 5. The mounting is then replaced in the yoke 8, being supported therein through the trunnions 7' 7'. The mountings are removable, as just described, on the front side of the machine only, the mountings on the other side not being removable. The rolls 4 are placed on the floor, and the mountings filled with cup grease, then the rolls are replaced in the mountings, and a new wire provided. It will appear that it would be quite a tedious operation to fill the mountings 6 with lubricant after the wire has been fixed in position. In the event the operator should overlook supplying lubricant to a mounting, he may, from time to time, supply lubricant thereto through the cup 19. However, when the mounting 6 is properly filled with lubricant, it is not necessary to lubricate the bearings until the wire is to be replaced, the initial supply of lubricant being quite sufficient for the four or five week period. The water from the saturated paper stock cannot, in any possible manner, find its way to the bearing 15, because of the grease provided in the recess 16. However, when as above stated, the operator overlooks the lubrication of the bearings, the hole 17 will serve to drain all accumulations of water in the recess 16 of the bushing 11, and thus prevent rusting of the bearing 15. It will be noted that the mounting is self-aligning, because of the trunnions 7' 7'.

If, after a time, the bearing 15 and the race ring 13 become worn, they may be readily replaced by removing the bushing 11.

While I have illustrated the details of a preferred embodiment of my invention, I, in no wise, limit myself to the details of construction shown, but claim all equivalent embodiments thereof, coming within the spirit and scope of the appended claims.

What I claim is:

1. A mounting for paper-rolls, and the like, comprising a hollow body member, a roller bearing therein for receiving a journal, said bearing having a race ring, and a bushing secured in said body member to hold said bearing in position, said bushing having a recess for receiving a supply of lubricant and a drain hole for said recess.

2. A mounting for paper-rolls, and the like, comprising a body member, a bearing therein for receiving a journal, and a bushing, secured in said body member, for holding said bearing in position, said bushing having a recess for receiving a supply of lubricant and a drain hole for said recess.

3. A mounting for paper-rolls, and the like, comprising a body member, a bearing therein for receiving a journal, and a bushing for holding said bearing in position, said bushing having a recess for receiving a supply of lubricant.

4. A mounting for paper-rolls, and the like, comprising a body member, a bearing therein for receiving a journal, and a bushing for holding said bearing in position, said bushing having a recess and drain hole for said recess.

5. A mounting for paper-rolls and the like, comprising a body member, a bearing therein for receiving a journal, trunnions on said body member, and a yoke for removably supporting said trunnions, said yoke being pivotally mounted to rotate about an axis extending transversely of said journal.

6. A mounting for paper-rolls, and the like, comprising a body member, a bearing therein for receiving a journal, trunnions on said member, and a yoke for supporting said trunnions, said yoke being pivotally mounted.

In witness whereof, I hereunto subscribe my name this 10th day of May, 1920.

JOHN H. REEDY.

Witnesses:
J. C. GIFFERN,
P. K. CARTIER.